(No Model.)

S. J. CLULEE.
FRAMELESS SPECTACLES OR EYEGLASSES.

No. 604,138. Patented May 17, 1898.

WITNESSES.
Charles T. Hannigan.
Remington Sherman

INVENTOR.
Stephen J. Clulee.
by Geo. H. Remington & Co.
Atty.

UNITED STATES PATENT OFFICE.

STEPHEN J. CLULEE, OF ATTLEBOROUGH, MASSACHUSETTS.

FRAMELESS SPECTACLES OR EYEGLASSES.

SPECIFICATION forming part of Letters Patent No. 604,138, dated May 17, 1898.

Application filed September 15, 1897. Serial No. 651,740. (No model.)

*To all whom it may concern:*

Be it known that I, STEPHEN J. CLULEE, a citizen of the United States, residing at Attleborough, in the county of Bristol and State of Massachusetts, have invented certain new and useful Improvements in Frameless Spectacles or Eyeglasses; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in the fittings or clips of frameless spectacles and eyeglasses; and it consists, essentially, of a two-arm clip having one of said arms reduced in thickness, elongated, and bent, whereby the same clip is adapted to readily receive and adjust or adapt itself to lenses varying greatly in thickness and shape, the construction being such that the clip will embrace maximum and minimum thickness lenses with equal facility. The lenses are firmly secured to the clip by means of a screw or bolt passing through all, substantially as common.

By means of my improved fitting or clip the objections or difficulties just referred to are practically overcome, since the one clip is readily adaptable to any form, size, and thickness of lens, the length of the bolt or clamping-screw employed being sufficient to extend through a lens of maximum thickness.

Figure 3:
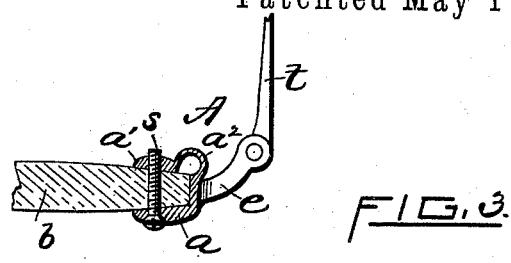
Figure 4:
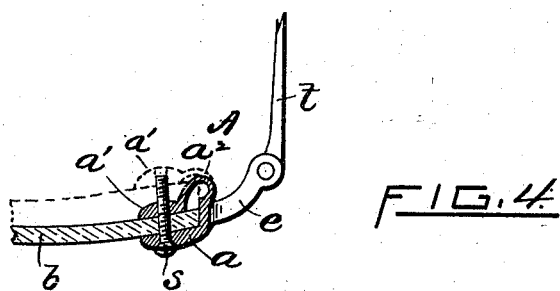
Figure 5:
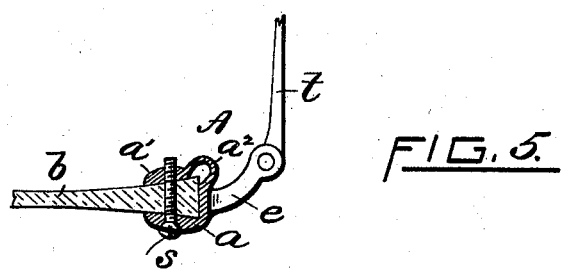
Figures 1, 2:
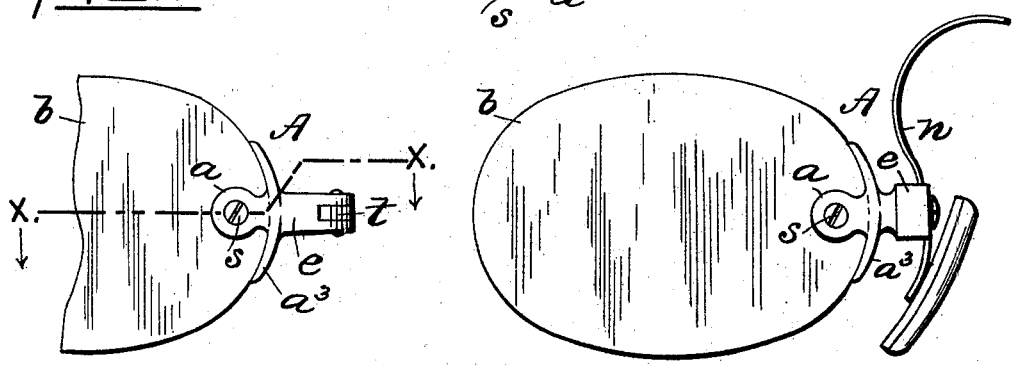

In the accompanying sheet of drawings, Figure 1 is a partial front side elevation, in enlarged scale, showing my improved clip adapted to a frameless-spectacle lens. Fig. 2 is a similar view showing the device combined with an eyeglass-lens; and Figs. 3, 4, and 5 are horizontal sectional views taken on line $x\,x$ of Fig. 1, showing the adaptability of the clip to lenses varying in shape and thickness.

I would state in passing that I am well aware that frameless spectacles and eyeglasses are old and well known, and I also recognize the fact that the lenses of such articles have been mounted in clips provided with two arms, between which the lenses are embraced and secured thereto by means of a clamping-screw passing through the whole. My present invention, however, has to do only with means whereby an integrally-formed clip is capable of being adjusted to lenses varying in thickness.

In the drawings, A indicates my improved one-piece clip or fitting as a whole. It is made of metal and is provided with a suitable head or outer extension $e$, in which, in the case of spectacles, the temple $t$ may be mounted in any well-known manner. Fig. 2 shows the said head portion arranged or modified to receive the bridge or nose-piece $n$ of an eyeglass. The clip A is further provided with a pair of laterally-separated inwardly-extending ears or arms $a\,a'$, arranged to receive and hold the lens $b$ between them. The front or, as shown in Figs. 3, 4, and 5, the lower arm $a$ is comparatively thick and has a hole therethrough in the center of its ear, in which is seated the head of the clamping-screw $s$. The ear portion of the rear or opposite arm $a'$ is also comparatively thick and is tapped to receive the screw-threaded shank portion of the said clamping-screw. The adjacent faces of said ears are suitably adapted to bear against the corresponding sides or faces of the lenses $b$, the latter having a hole therethrough registering with said holes formed in the two ears for the passage of the clamping-screw, whereby the whole may be firmly clamped together.

The portion of the arm $a'$ between its ear and the body part is reduced in thickness and elongated and also bent substantially as shown at $a^2$. By means of this construction the clip is rendered sufficiently pliable or yielding as to automatically adapt itself to lenses varying greatly in thickness and shape. (See Figs. 3 and 5 and particularly Fig. 4.) In the last-named figure the dotted lines indicate a lens, say, of maximum thickness. It will be seen, too, that owing to the presence of the thin or yielding tie portion $a^2$ the ear $a'$ is adapted to conform to and bear snugly against the corresponding face of the lens and irrespective of the shape of the latter. I would add that the other arm $a$ itself is made sufficiently stiff and strong to successfully withstand all the pressure or force to which the spectacle or eyeglass may be subjected without depending upon the said tie portion.

I prefer to provide my improved clip with the side wings $a^3$, adapted to bear against the edge of the lens, as usual, although they may be omitted, if desired.

I claim as my invention—

As a new article of manufacture, a clip for frameless spectacles and eyeglasses consisting of a body portion, an arm or ear portion extending from the front end of the body portion, and an arm or ear portion connected with the rear end of the body portion by an elongated pliable non-resilient bent portion, the said arms or ear portions bearing against the opposite faces of the lens and being provided with perforations to receive the fastening-screw.

In testimony whereof I have affixed my signature in presence of two witnesses.

STEPHEN J. CLULEE.

Witnesses:
GEO. H. REMINGTON,
REMINGTON SHERMAN.